(12) United States Patent
Lair et al.

(10) Patent No.: US 6,895,742 B2
(45) Date of Patent: May 24, 2005

(54) BIFOLD DOOR THRUST REVERSER

(75) Inventors: Jean-Pierre Lair, San Antonio, TX (US); Frederick Henry Peters, Tulsa, OK (US)

(73) Assignee: The Nordam Group, Inc., Tulsa, OK (US)

( * ) Notice: Subject to any disclaimer, the term of this patent is extended or adjusted under 35 U.S.C. 154(b) by 0 days.

(21) Appl. No.: 10/679,882

(22) Filed: Oct. 6, 2003

(65) Prior Publication Data

US 2004/0068978 A1 Apr. 15, 2004

Related U.S. Application Data

(60) Provisional application No. 60/478,163, filed on Jun. 13, 2003, provisional application No. 60/456,710, filed on Mar. 22, 2003, and provisional application No. 60/417,848, filed on Oct. 11, 2002.

(51) Int. Cl.[7] ............................. F02K 3/02; B05B 12/00
(52) U.S. Cl. ...................... 60/226.2; 60/230; 60/223; 244/110 B; 239/265.37; 239/265.39
(58) Field of Search ..................... 60/223, 230, 226.2; 244/110 B; 239/265.25, 265.37, 265.39

(56) References Cited

U.S. PATENT DOCUMENTS 3,503,211 A    4/1968  Medawar et al.
3,475,913 A  * 11/1969  Mortlock et al. ............. 60/229
3,614,037 A    10/1971 Vdolek
3,739,582 A  *  6/1973  Maison ...................... 60/226.2
3,764,096 A  * 10/1973  Wright .................... 244/110 B
3,779,010 A    12/1973 Chamay et al.
3,829,020 A     8/1974 Stearns
4,922,713 A     5/1990 Barbarin et al.
5,655,360 A     8/1997 Butler
5,779,192 A     7/1998 Metezeau et al.
5,826,823 A    10/1998 Lymons et al.
5,913,476 A     6/1999 Gonidec et al.
5,987,880 A  * 11/1999  Culbertson .................... 60/204
6,568,172 B2    5/2003 Jannetta et al.

* cited by examiner

Primary Examiner—Charles G. Freay
(74) Attorney, Agent, or Firm—Francis L. Conte

(57) ABSTRACT

A fan thrust reverser includes an outer louver door joined to an inner blocker door by a drive link in a bifold configuration. The louver door is stowed closed in the outer skin of a fan nacelle outside the blocker door stowed closed in the inner skin of the nacelle. An actuator deploys open the louver and blocker doors, with the louver door extending radially outwardly and the blocker door extending radially inwardly for reversing fan exhaust flow during thrust reverse operation.

40 Claims, 13 Drawing Sheets

BIFOLD DOOR THRUST REVERSER

This application claims the benefit of U.S. Provisional Applications No. 60/417,848, filed Oct. 11, 2002; 60/456,710, filed Mar. 22, 2003; and 60/478,163, filed Jun. 13, 2003.

BACKGROUND OF THE INVENTION

The present invention relates generally to aircraft engines, and, more specifically, to thrust reversers therein.

Turbofan engines are typically composed of a fan driven at the front of the engine that draws air through a bypass duct that is bounded by the engine cowling on the inner surface and by the fan cowling on the outer surface. In the case of a short nacelle, the generally annular duct that is bounded by the inner cowling and the outer cowling channels the bypass flow only, while in the case of a long nacelle, the upstream portion of the annular duct channels the bypass flow only, and its downstream portion channels both the bypass flow and the engine core flow.

Thrust reversers for turbofan type engines are well known in the art. The nacelle of the turbofan engine on which the thrust reverser can be installed can be long or short. The engine of the aircraft can be installed under the wing or on the fuselage. The thrust reverser can be installed on commercial or business aircraft.

The known prior art fan thrust reversers can be, generally speaking, categorized in three distinct types. The first type effects aft axial translation of the bypass structure for deployment of a series of blocker doors inside the bypass duct structure and the opening of an aperture in conjunction with exposing of radial cascade vanes for redirecting the bypass flow in the forward direction.

The second type also effects aft axial translation of the bypass structure for closing the bypass flow duct and opening an aperture for redirecting the bypass flow in the forward direction. The aperture of the prior art may or may not be equipped with cascades vanes. The second type differs from the first type as the series of blocker doors is no longer present.

The third type includes doors that rotate inside the bypass flow and outside in the ambient air for redirecting the bypass flow in the forward direction. This fan reverser type is generally called petal or pivoting door reverser.

The drawbacks of the first type prior art fan reversers are the necessity to provide aft translation capability to the rear portion of the bypass duct for reversing the fan flow, and the presence in the bypass duct of links, known as drag links, for the deployment of the series of blocker doors. The drag links degrade engine performance in forward thrust, while the required guiding and sliding tracks of the translating cowls increase weight of the nacelle.

While the second type of fan reverser appears to be an improvement, since the drag links and the associated series of blocker doors have been eliminated, its drawback is that it necessitates the provision of a large bulge on the cowling of the engine so that the structure of the bypass duct that translates rearward can block the bypass flow for reverse flow purposes.

Although the third type appears to be an improvement over the first and second types, its main drawback is the presence of wells in the bypass duct for housing the actuators that control pivoting of the doors. The forward engine performance degradation that is associated with these wells usually requires an additional flap mechanism for fairing them. Other drawbacks of this type of fan reverser are the required large actuator stroke and the extensive protrusion of the pivoting doors in the ambient air when they are pivoted to their deployed position.

Accordingly, it is desired to provide an improved fan thrust reverser which is self contained in the fan nacelle for reducing size, complexity, weight, and drag.

More specifically, a first object of the thrust reverser is to provide thrust reverse in a turbofan engine that does not require aft translation of any portion of the bypass duct.

A second object of the reverser is to eliminate drag links in the bypass duct when the reverser is in its forward thrust position.

A third object of the reverser is to provide for optimum direct thrust performance of the engine, and a clean aerodynamic boundary flow surface for the outer cowling of the bypass duct.

A fourth object of the reverser is to limit the amount of external protrusion in the ambient air of the thrust reverser structure when in the deployed position.

A fifth object of the reverser is to reduce the stroke of the deployment actuators for further weight reduction.

BRIEF SUMMARY OF THE INVENTION

A fan thrust reverser includes an outer louver door joined to an inner blocker door by a drive link in a bifold configuration. The louver door is stowed closed in the outer skin of a fan nacelle outside the blocker door stowed closed in the inner skin of the nacelle. An actuator deploys open the louver and blocker doors, with the louver door extending radially outwardly and the blocker door extending radially inwardly for reversing fan exhaust flow during thrust reverse operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
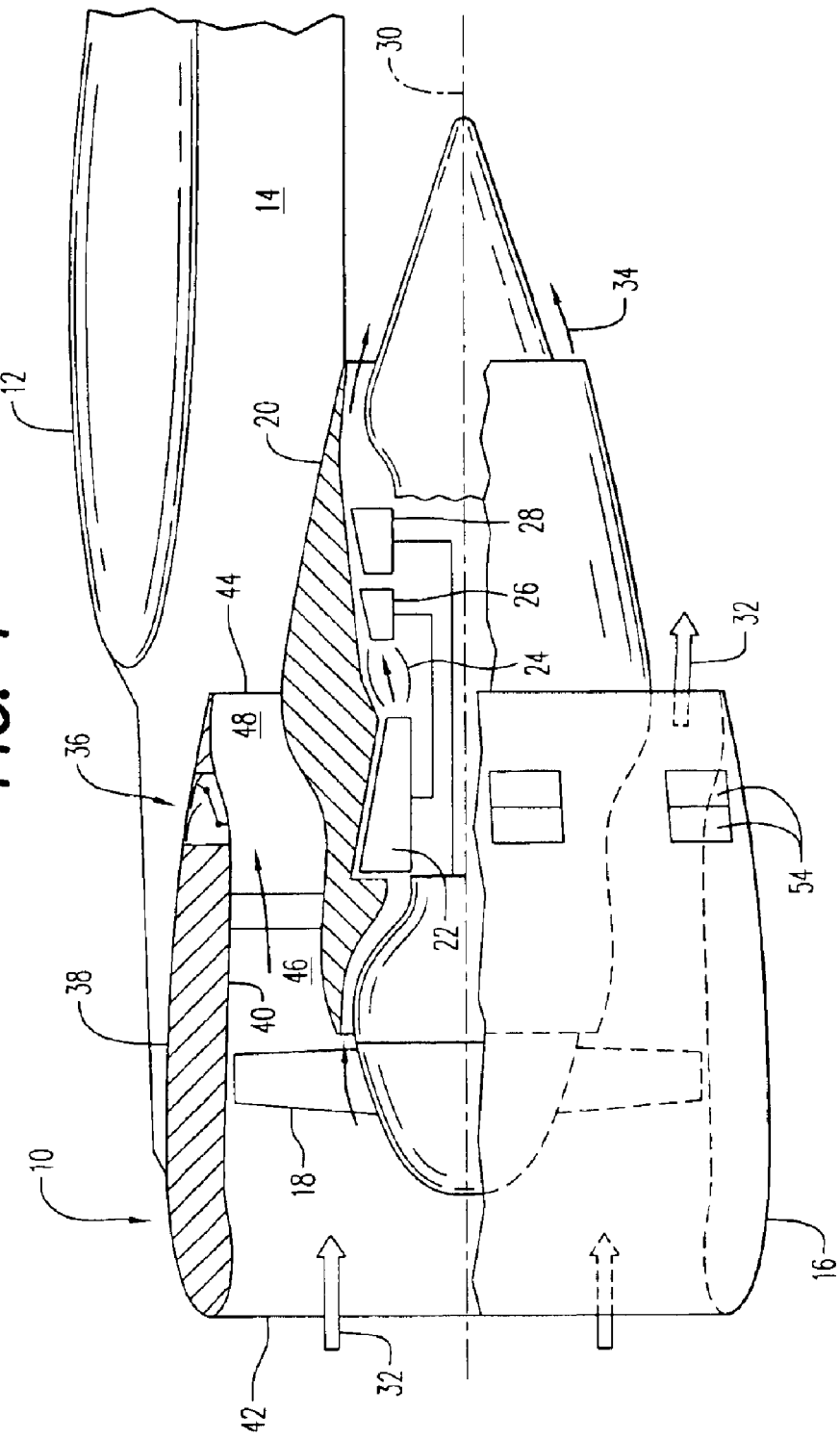
FIG. 1 is a partly sectional axial view of an exemplary turbofan aircraft gas turbine engine mounted to an aircraft wing, and including a fan thrust reverser integrated in the fan nacelle thereof.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of the air is pressurized by the driven fan 18 for producing a substantial portion of the propulsion thrust powering the aircraft in flight. The combustion gases 34 are exhausted from the aft outlet of the core engine for providing additional thrust.

However, during landing operation of the aircraft, thrust reversal is desired for aerodynamically slowing or braking the speed of the aircraft as it decelerates along a runway. Accordingly, the turbofan engine 10 includes a fan thrust reverser 36 wholly contained in or integrated into the fan nacelle 16 for selectively reversing fan thrust during aircraft landing.

The fan thrust reverser, or simply fan reverser 36 is integrated directly into the fan nacelle 16. The fan nacelle includes radially outer and inner cowlings or skins 38,40 which extend axially from a leading edge of the nacelle defining an annular inlet 42 to an opposite trailing edge defining an annular outlet 44. As additionally shown in FIGS. 2 and 3, the fan nacelle 16 may have any conventional configuration, and is typically formed in two generally C-shaped halves which are pivotally joined to the supporting pylon 14 for being opened during maintenance operations.

Figure 2:
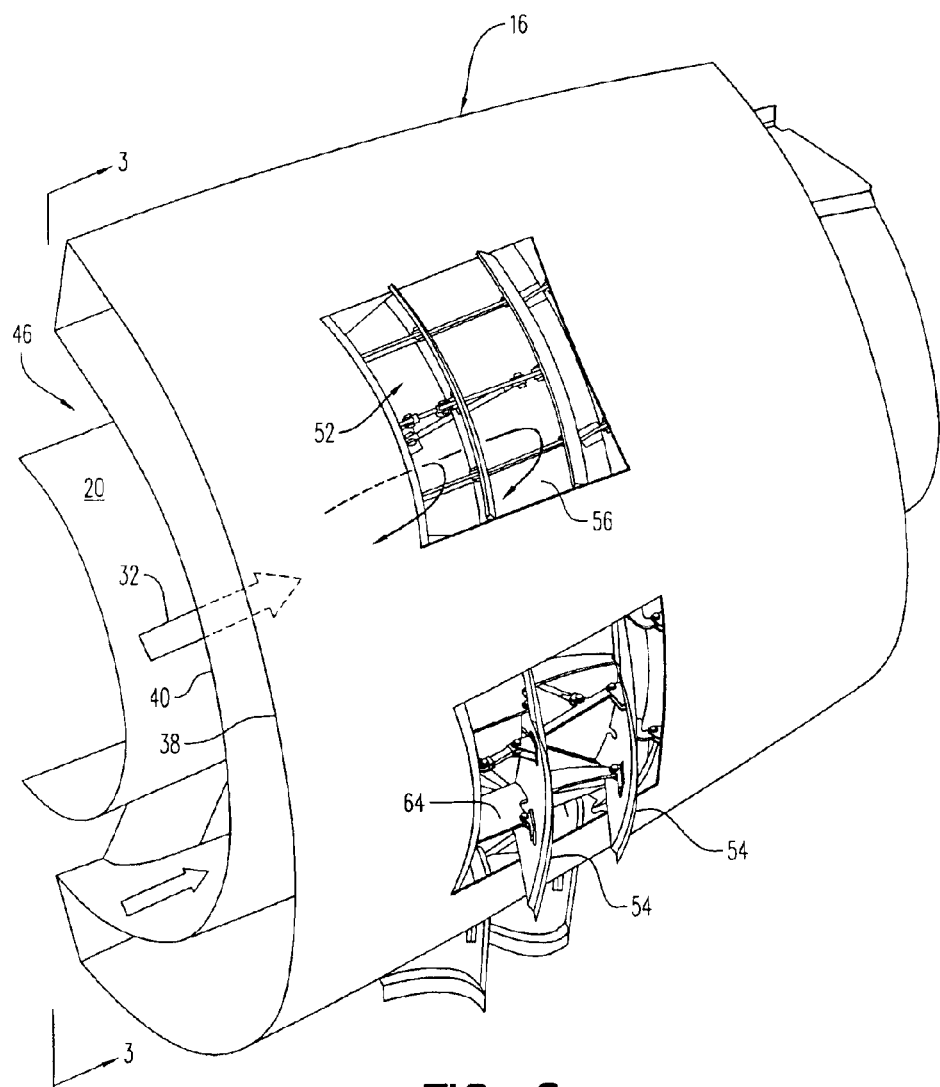
FIG. 2 is an isometric view of a symmetrical half of the fan nacelle shown in FIG. 1 illustrating deployment of the fan thrust reverser therein.
Figure 3:
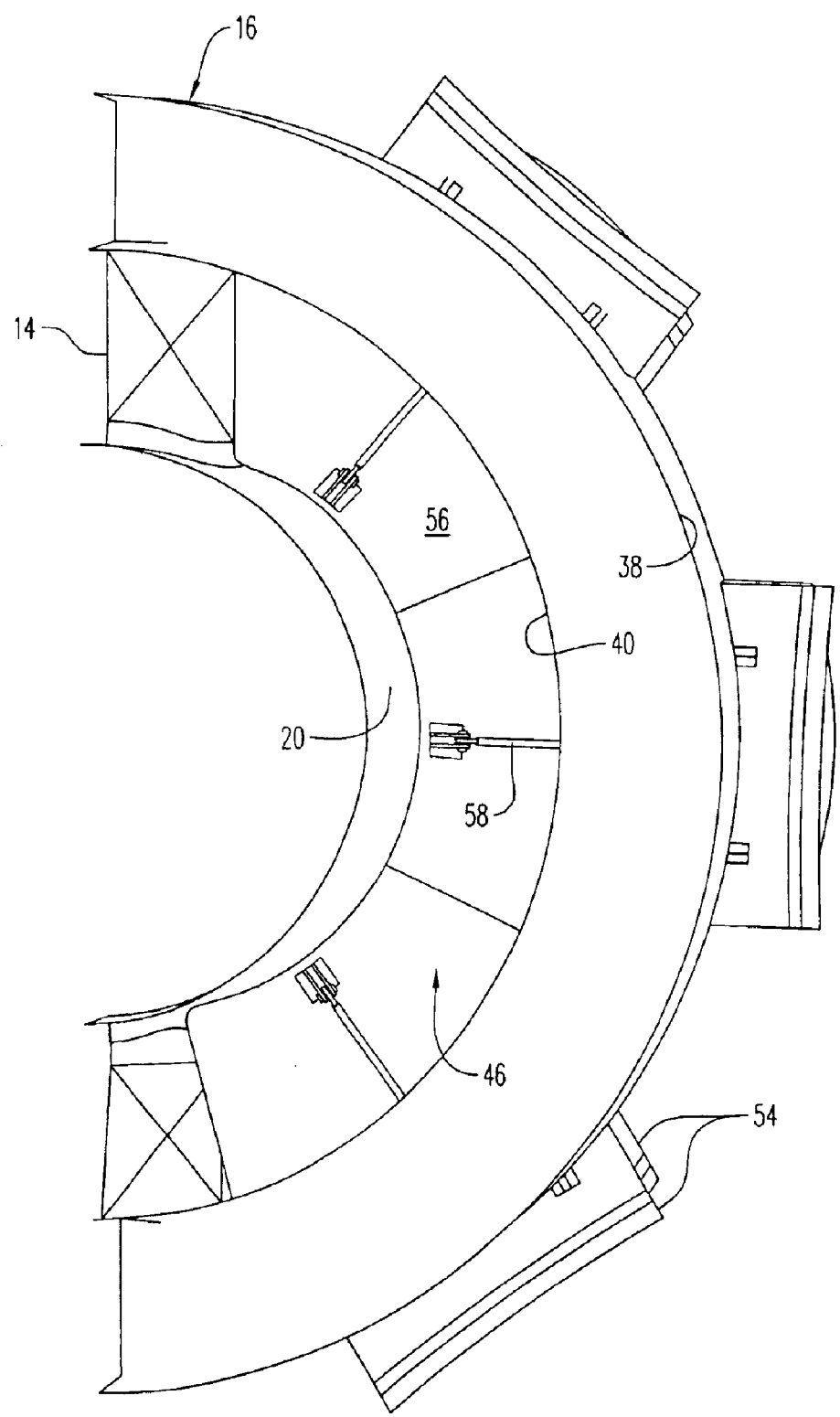
FIG. 3 is a radial sectional view of the nacelle illustrated in FIG. 2 and taken generally along line 3—3.

The exemplary fan nacelle illustrated in FIGS. 1–3 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle 16 by a row of supporting struts in a conventional manner. The core cowl 20 is spaced radially inwardly from the inner skin 40 of the fan nacelle to define an annular bypass duct 46 therebetween which bypasses a major portion of the fan air around the core engine during operation. The fan bypass duct terminates in an annular fan nozzle 48 at the nacelle trailing edge or outlet 44.

A particular advantage of the fan reverser 36 is that the fan nozzle 48 itself may remain fixed at the aft end of the fan nacelle surrounding the core engine. And, the fan reverser 36 may be fully integrated in the fan nacelle immediately forward or upstream from the fixed fan nozzle.

Figure 4:
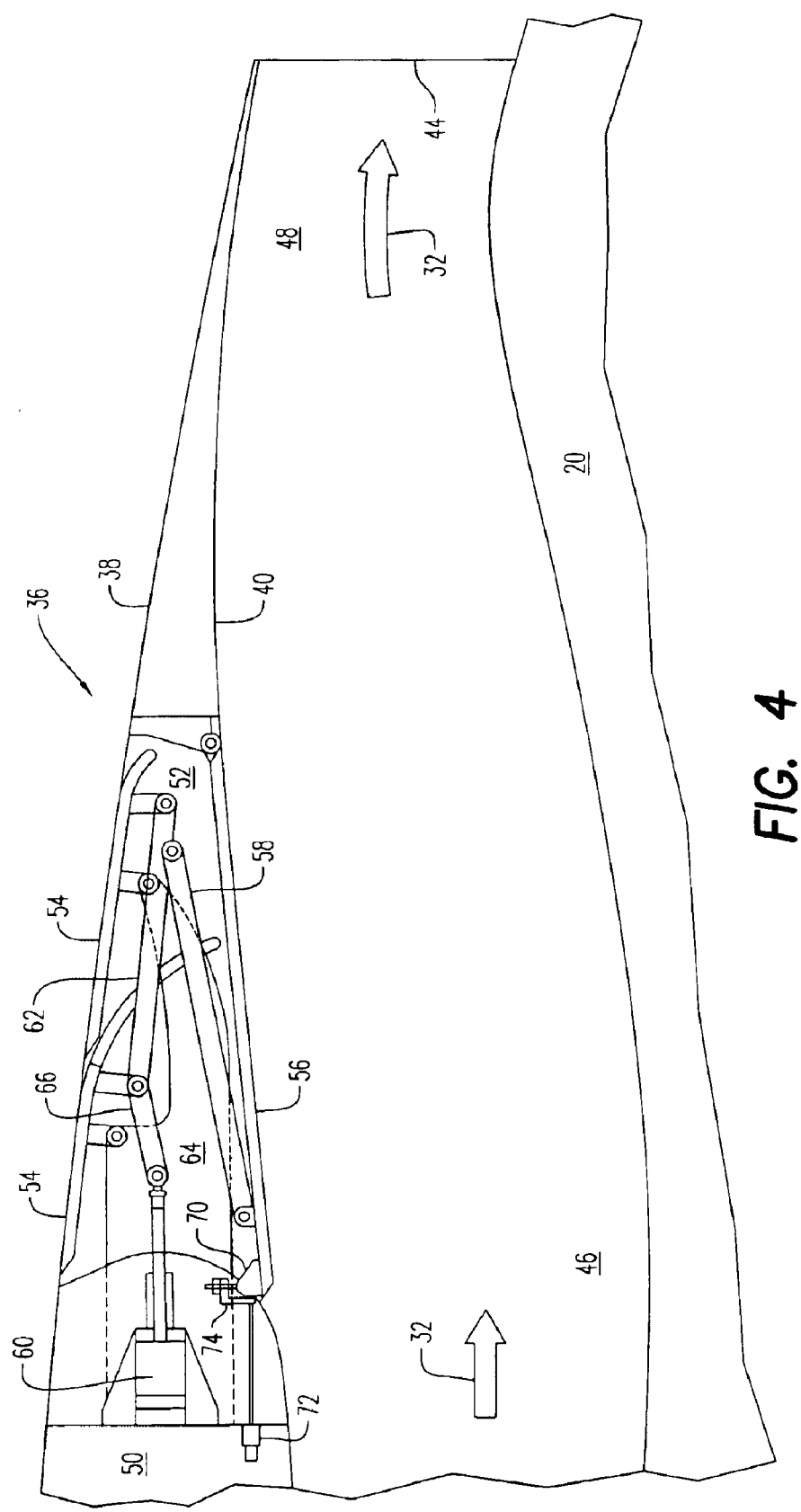
FIG. 4 is an axial sectional view of a first embodiment of the fan reverser illustrated in FIGS. 1–3 in a stowed position.
Figure 5:
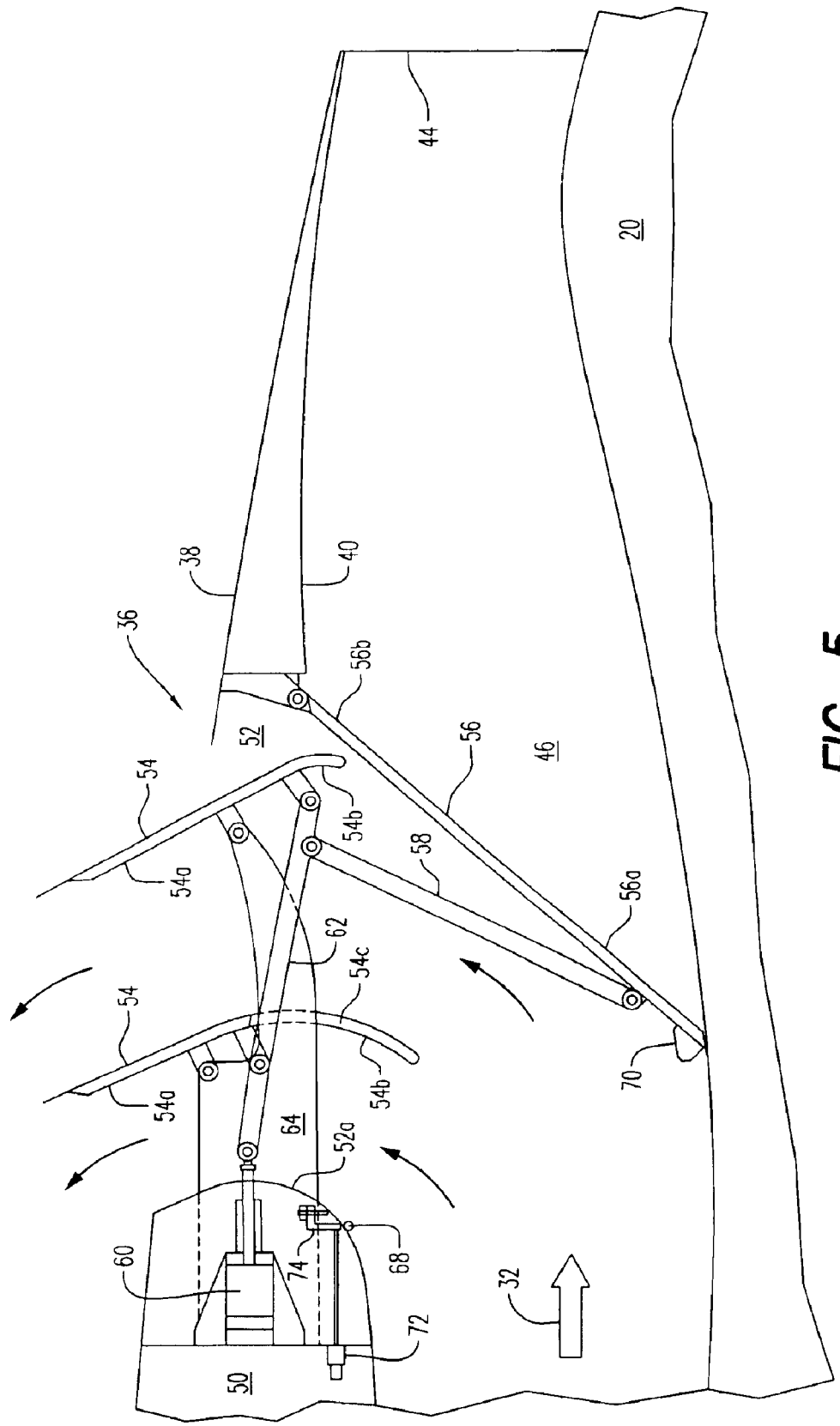
FIG. 5 is an axial sectional view of the fan reverser illustrated in FIG. 4 shown in a deployed position.

More specifically, the fan reverser is illustrated in more detail in FIGS. 4 and 5 wherein the outer and inner skins 38,40 are spaced radially apart to define an arcuate compartment or annulus 50 spaced axially forwardly from the nacelle trailing edge 44. The nacelle compartment 50 includes a flow tunnel or aperture 52 extending radially between the inner and outer skins through which the pressurized fan bypass air 32 may be discharged during thrust reverse operation.

At least one, and preferably a gang or set of radially outer louver doors 54 are suitably pivotally joined to the fan nacelle in the compartment 50 to close the exit end of the tunnel along the outer skin 38. Two or more of the louver doors may be axially nested together as further described hereinbelow.

A corresponding radially inner reverser or blocker door 56 is suitably pivotally joined to the fan nacelle 16 inside the compartment 50 in radial opposition with the gang of louver doors 54 to close the inlet end of the tunnel along the inner skin 40. In the stowed closed position illustrated in FIG. 4, the inner door 56 is folded closed generally parallel with the corresponding gang of outer doors 54, converging slightly to conform with the converging profile or cross section of the nacelle.

Means in the form of an elongate drive link 58 pivotally joins together the outer and inner doors for coordinating the simultaneous deployment thereof. Means in the form of a linear drive actuator 60 are suitably mounted in the nacelle compartment and joined to the doors for selective rotation thereof from the stowed position illustrated in FIG. 4 at which the doors are pivoted closed substantially flush in the outer and inner skins 38,40 respectively.

The actuator 60 may be operated in reverse for rotating the doors to a deployed position illustrated in FIG. 5 at which the outer doors 54 are pivoted open and extend radially outwardly in part from the outer skin 38, with the inner door 56 being pivoted open and extending radially inwardly in most part from the inner skin 40. The outer and inner doors are interconnected by the drive link 58 in an accordion or bifold manner in which the doors collapse or fold together in the stowed position illustrated in FIG. 4, and swing open with opposite inclinations in the deployed position illustrated in FIG. 5.

The bifold configuration of the outer louver doors and inner blocker door permits all the components of the fan reverser to be integrated and hidden within the axial extent of the radial compartment 50 between the outer and inner skins. The doors 54,56, the drive link 58, and the drive actuator 60 are fully contained within the compartment in the stowed position illustrated in FIG. 4 without any flow obstruction by these reverser components inside the inner skin 40 of the nacelle.

In this way, the inner skin 40 including the stowed blocker door 56, maintains a substantially smooth and flush inner boundary or flow contour of the fan nacelle surrounding the bypass duct 46 for maintaining aerodynamic efficiency of the fan air discharged therethrough without obstruction. And, the outer skin 38 including the stowed louver doors 54 remains substantially smooth and flush for minimizing aerodynamic drag as the engine propels the aircraft at altitude.

In the preferred embodiment illustrated in FIGS. 4 and 5, a pair of the outer louver doors 54 are arranged in axial series in the common flow tunnel 52 in axial and circumferential alignment atop the common blocker door 56 disposed therebelow. An elongate unison link 62 pivotally joins together the gang of louver doors 54 so that they may open and close simultaneously in the manner of commonly known louver windows.

The common drive link 58 pivotally joins together the gang of louver doors and the complementary blocker door 56. The drive actuator 60 may then be used for deploying outwardly in unison the louver doors as the cooperating blocker door is simultaneously deployed inwardly. In this way, the one set of blocker and louver doors may be deployed simultaneously as the doors unfold from each other, with the louver doors being inclined radially outwardly and facing forwardly, and the blocker door being inclined radially inwardly and forwardly in the deployed position illustrated in FIG. 5.

Figure 6:
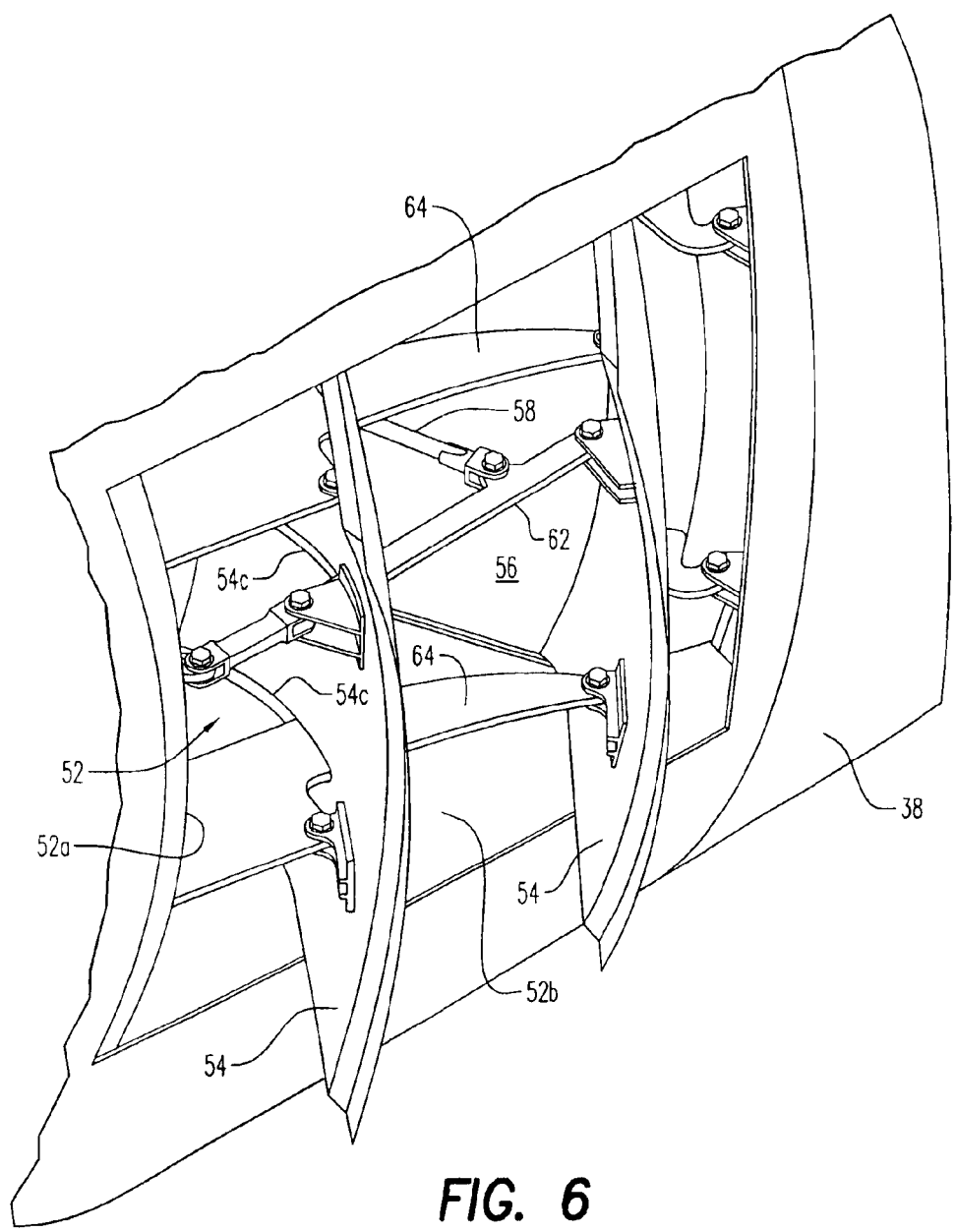
FIG. 6 is an enlarged isometric view of a representative set of the reverser doors illustrated in FIG. 2 in an exemplary embodiment.

The louver doors 54 illustrated in FIGS. 4–6 are configured for multiple purposes including smoothly closing the flow tunnel in the outer skin 38 when the louvers are stowed closed. And, when deployed open, the louver doors are inclined radially outwardly and forwardly for reversing direction of the fan bypass flow 32 for fan thrust reversal, while additionally turning the airflow through the flow tunnel.

As shown in FIG. 5, each louver door 54 includes an axially forward portion or end 54a and an aft portion or end 54b, and is suitably pivotally mounted to the nacelle axially between those ends. In this way, the door forward end can be deployed radially outwardly from the outer skin with reduced extension or protrusion into the ambient airstream surrounding the outer skin. And, the door aft end can be deployed radially inwardly from the outer skin, and from preferably also the inner skin for turning the fan bypass flow.

The use of multiple louver doors 54 in series permits their individual sizes to be correspondingly smaller for closing in unison the common flow tunnel 52. And, the smaller louver doors are effective for turning corresponding portions of the bypass flow, and distributing the aerodynamic loads thereon.

Correspondingly, the inner blocker door 56 illustrated in FIG. 5 includes an axially forward portion or end 56a and an aft portion or end 56b, and is pivotally joined to the nacelle 16 adjacent the aft end of the blocker door. In this way, the blocker door 56 may be deployed radially inwardly into the bypass duct 46 in unfolding or bifold opposition with the outer louver doors 54. The blocker door 56 is suitably sized in axial length to radially reach the core cowl 20 when deployed. The blocker door 56 therefore bridges the entire radial extent of the bypass duct 46 for blocking and diverting the fan bypass flow 32 radially outwardly into the oppositely inclined open louver doors 54 which redirect the bypass flow axially forwardly for thrust reverse operation.

The louver doors 54 are illustrated deployed open in FIG. 5, and the corresponding aft ends 54b thereof are preferably axially or radially arcuate for efficiently turning the incoming bypass flow 32 during thrust reverse operation. The distal edges at the aft ends of the louver doors therefore define leading edges which first receive the bypass flow 32 during thrust reverse operation. In contrast, the distal edge of the forward end 56a of the blocker door defines the leading edge over which the bypass flow 32 is channeled during thrust reverse operation.

The arcuate aft end 54b of the aft louver door is configured to adjoin the aft end 56b of the corresponding blocker door 56 in the deployed position illustrated in FIG. 5 for cooperating therewith for reverse turning the bypass flow 32 from the blocker door to the louver door. The aft louver door and the cooperating blocker door therefore effect a generally V-shaped configuration open forward towards the incoming bypass air for reverse turning thereof.

Since the forward louver door 54 illustrated in FIG. 5 is also used for reversing the fan bypass flow, the aft end 54b thereof is also axially or radially arcuate for initially turning the bypass flow. Since the forward louver door is spaced axially forwardly of the aft louver door and the deployed blocker door 56, its aft end 54b preferably has axially longer curvature than the aft end of the aft louver door. In this way, the aft end of the forward louver door may be suitably configured for efficiently turning the bypass flow by itself, in contrast with the aft louver door 54 which cooperates with the adjoining blocker door 56.

The louver doors 54 illustrated in FIG. 5 may therefore be suitably mounted in the nacelle so that their aft ends 54b can be deployed radially inwardly into the fan bypass duct 46, while their corresponding forward ends 54a are inclined radially outwardly from the outer skin 38 with minimum protrusion into the ambient airstream.

The corresponding forward ends 54a of the louver doors 54 illustrated in FIGS. 4 and 5 are preferably generally straight or slightly arcuate in the axial direction to conform with the contour of the outer skin 38. When stowed closed in FIG. 4, the louver doors close the flow tunnel and provide smooth continuity with the outer skin 38.

Since the aft ends of the louver doors are axially arcuate as illustrated in FIG. 4, they extend radially inwardly from the outer skin, and are fully contained in the compartment 50 when stowed. The louver doors are axially nested or overlap each other, and are coextensive with the outer skin when stowed.

The louver doors 54 and blocker door 56 may be suitably mounted to the fan nacelle in any convenient manner for effecting the improved deployment thereof as described above. For example, a pair of circumferentially spaced apart cantilevers 64 have corresponding proximal ends which are suitably fixedly mounted to the nacelle in the common compartment 50. The cantilevers are preferably thin beams circumferentially and thick radially to provide sufficient strength for supporting the louver doors therefrom while minimizing obstruction of the airflow during thrust reverse operation. As shown in FIG. 6, the two cantilevers 64 define with the two deployed louver doors 54 a grate like those typically found in fixed cascade vanes, but using the movable louver doors.

The aft louver door 54 is suitably pivotally joined to the distal ends of the two cantilevers, with the forward louver door 54 being pivotally joined at an intermediate location on the cantilevers forward of the aft distal end thereof In this way, the thin cantilevers support the louver doors 54 under tension against the aerodynamic pressure loads exerted on the louver doors when deployed.

Since the forward louver door 54 illustrated in FIGS. 5 and 6 is mounted forwardly of the aft louver door on the common cantilevers 64, the forward louver door includes corresponding axial slots 54c extending in the aft end thereof for receiving or passing the cantilevers to the aft louver door. In this way, the forward louver door straddles the cantilevers, whereas the aft louver door is mounted to the distal ends thereof.

The various pivotal connections or joints required for the louver and blocker doors, actuating links, and drive actuator may be provided in any conventional manner. For example, suitable clevis brackets may be fixedly joined to the doors for pin mounting to the cantilevers and corresponding internal frames in the nacelle.

In the preferred embodiment illustrated in FIG. 5, the unison link 62 is pivotally joined to the two louver doors 54 in corresponding devises thereon mounted in the louver doors aft of the devises which pivotally join the louver doors to the cantilevers in the nacelle. In this way, the various components of the actuating means may be fully contained within the nacelle compartment 50 for efficiently kinematically opening and closing the doors in unison.

In the preferred embodiment illustrated in FIG. 5, the drive link 58 is pivotally joined between the aft end of the unison link 62 and the forward end 56a of the blocker door 56. In this way, as the unison link 62 is deployed aft in the nacelle, the drive link 58 opens inwardly the attached blocker door 56 which pivots at its aft end. Correspondingly, retraction forwardly of the unison link 62 retracts outwardly the drive link 58 and the attached blocker door 56 to the stowed position illustrated in FIG. 4.

As shown in FIG. 6, a single unison link 62 may be mounted axially between the louver doors 54, and circumferentially centrally between the two cantilevers 64. Correspondingly, the forward louver door 54 includes another axial slot 54c in the aft end thereof for receiving the axially extending unison link 62 therethrough.

As shown in FIGS. 4 and 5, the drive actuator 60 is preferably fixedly joined to a suitable frame in the nacelle 16 inside the forward end of the common compartment 50. The actuator has an extendable output rod which is pivotally joined to the forward end of the unison link 62 by a short idler link 66 therebetween. Since the actuator housing is fixed, the idler link 66 provides suitable articulation between the actuator rod and the unison link for permitting simultaneous deployment of the interconnected louver doors and blocker door.

In FIG. 4, extension of the actuator rod in turn pushes aft the idler link 66 and unison link 62 for pivoting closed the louver doors 54 on their respective pivot joints while also pivoting closed the interconnected blocker door 56. In FIG. 5, the actuator rod is retracted forwardly which in turn pulls the idler link 66 and unison link 62 forwardly for pivoting open the two louver doors 54 around their respective pivot axes while driving radially inwardly the drive link 58 for opening the blocker door 56.

When stowed, the louver doors 54 illustrated in FIG. 4 close the outlet end of the flow tunnel 52, while the blocker door 56 closes the inlet end of the flow tunnel. And, the entire fan reverser assembly is fully contained within the annular compartment 50 between the outer and inner nacelle skins.

Since the flow tunnel 52 illustrated in FIGS. 5 and 6 extends radially through the radial extent of the fan nacelle, it may include suitable perimeter walls for channeling the fan air outwardly therethrough. Preferably, the flow tunnel 52 has a radially arcuate or convex forward wall 52a, and pair of preferably flat sidewalls 52b extending axially aft therefrom. As shown in FIG. 5, the radially inner portion of the convex forward wall 52a is preferably substantially concentric with the axially arcuate aft ends 54b of both louver doors 54 when deployed. In this way, these curved elements improve the turning efficiency of the fan air passing through the lower inlet of the flow tunnel.

Correspondingly, the radially outer end of the forward wall 52a of the flow tunnel is preferably inclined axially forward at the nacelle outer skin 38, and the forward ends 54a of the two louver doors are preferably disposed substantially parallel thereto when deployed. In this way, the cooperating inclined portions of the forward wall and louver doors efficiently discharge the bypass air during thrust reversal.

If desired, the flow passages defined between the forward wall and forward louver door and between the two louver doors may converge in flow area from their radially inner inlets to their radially outer outlets for improving efficiency of thrust reversal.

Figure 7:
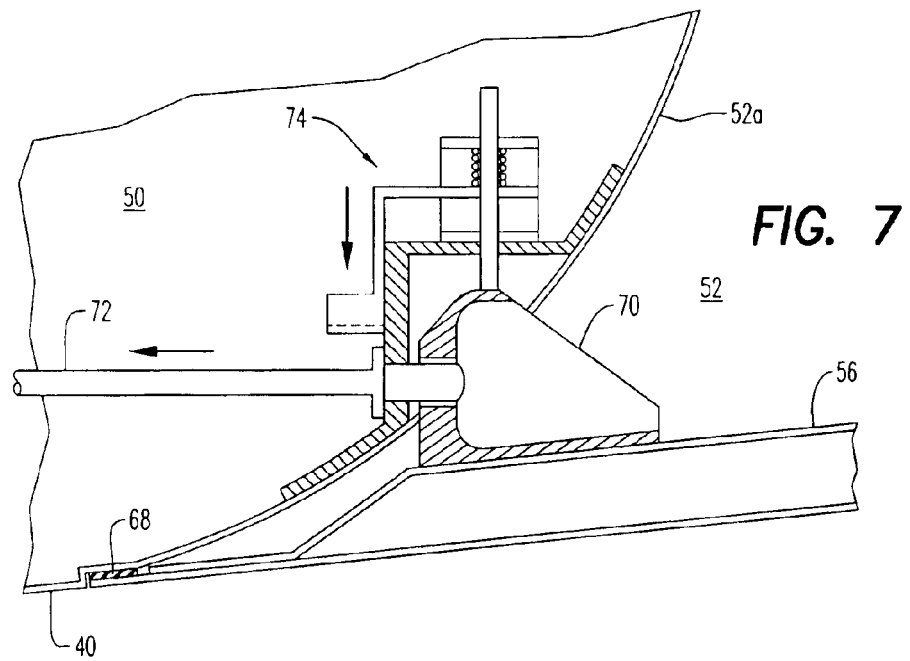
FIG. 7 is an enlarged axial sectional view through a forward portion of the inner blocker door illustrated in FIG. 4 showing a locking mechanism in accordance with an exemplary embodiment.

As illustrated in FIGS. 5 and 7, the flow tunnel 52 preferably includes a perimeter seal 68 located adjacent the inner skin 40 against which the blocker door 56 compresses when stowed. As indicated above, the closed blocker door 56 provides a smooth, coextensive portion of the inner skin 40 along which the fan bypass air 32 flows during normal operation. The fan air is pressurized by the fan and exerts pressure forces over the inner surface of the blocker door for maintaining closed the blocker door during operation. The perimeter seal 68 inside the blocker door seals flow leakage into the internal compartment 50.

Although extension of the actuator 60 illustrated in FIG. 4, and the internal pressure of the fan bypass flow 32 cooperate to maintain closed the louver and blocker doors 54,56, it is also desirable to provide a further mechanism for locking closed the doors of the thrust reverser.

Figure 8:
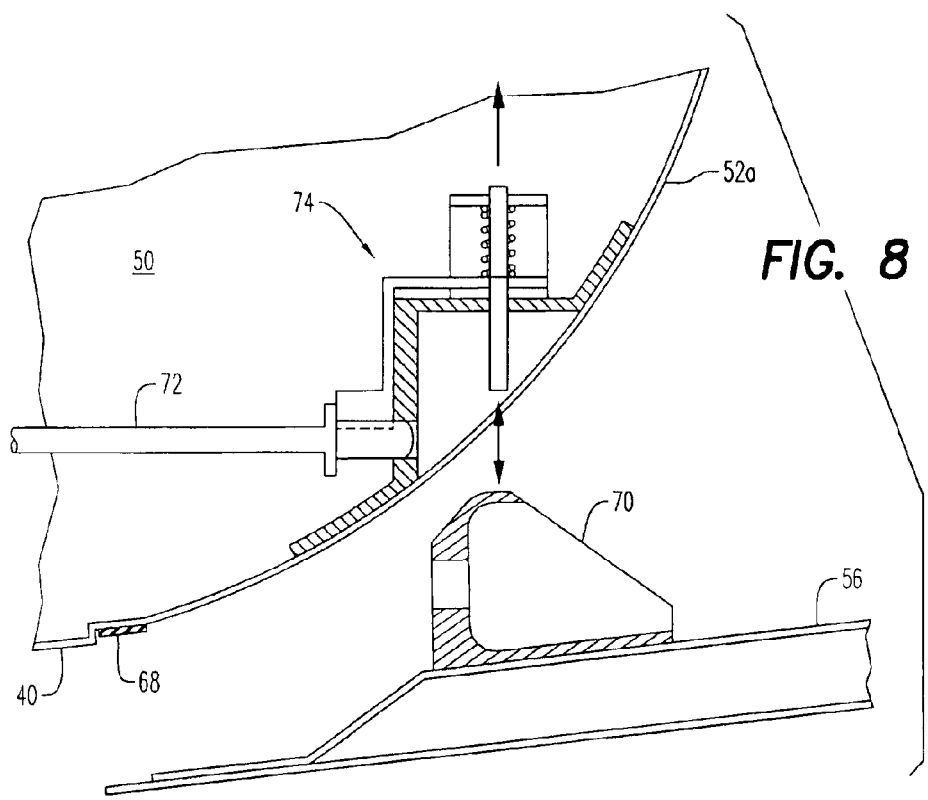
FIG. 8 is an axial sectional view, like FIG. 7, of the forward end of the inner blocker door upon unlocking deployment thereof.

Accordingly, FIGS. 4 and 7 illustrate an exemplary embodiment of suitable means for selectively locking closed the outer and inner doors 54,56 in their stowed position, with FIGS. 5 and 8 illustrating unlocking of the doors during deployment. As best shown in FIG. 7, the locking means include a locking bracket or tab 70 fixedly mounted inside the forward end of the blocker door 56. A locking actuator 72 is fixedly mounted inside the nacelle and has an extendable rod aligned with the locking tab for engaging an aperture therein to lock closed the blocker door 56 when stowed. Retraction of the actuator rod releases the locking tab 70 and permits deployment of the blocker door.

The locking actuator 72 is independent of the drive actuator 60, and these actuators may have any conventional configurations such as electrical, hydraulic, or pneumatic with corresponding output rods that may be retracted or extended as desired.

As additionally shown in FIGS. 7 and 8, the locking means preferably also includes a spring-loaded retainer 74 mounted to the nacelle adjacent the distal end of the output rod of the actuator. The retainer 74 provides many functions.

For example, the retainer 74 includes a corresponding bracket with an aperture therethrough in which the complementary tab 70 may nest as illustrated in FIG. 7 so that the distal end of the actuator rod 72 may fixedly lock the tab in the retainer.

As shown in FIG. 8, the distal end of the actuator rod includes an annular flange which may be captured by a corresponding tab which is spring-loaded in the retainer for retaining retracted the rod of the locking actuator when the doors are deployed open. In this way, the locking actuator may be de-energized while the retention tab prevents the actuator rod from extending into the retainer bracket. Preferably, the rod in the locking actuator 72 is spring-loaded to automatically extend when de-energized, so that upon retraction of the retention tab the rod can automatically extend.

The retainer 74 illustrated in FIG. 8 also includes a radial pin around which a compression spring is mounted, with the tab 70 including a corresponding land for depressing outwardly the spring-loaded pin as the blocker door is stowed. In this way, the rising pin in turn raises the retention tab for unlocking the actuator rod. The actuator rod may then be driven to re-engage the apertures in the retainer 74 and tab 70 as illustrated in FIG. 7 for locking the blocker door.

For failsafe operation in the event of failure of the spring-loaded retainer 74, the tab 70 includes an inclined cam surface above the aperture therein configured for engaging the distal end of the spring-loaded actuator rod for self-retraction as the blocker door is stowed.

Since the fan bypass duct 46 illustrated in FIGS. 1–3 is substantially annular, the fan reverser includes corresponding groups of the louver doors 54 and cooperating blocker door 56 spaced circumferentially apart around the perimeter of the fan nacelle 16. For example, in each half C-duct portion of the fan nacelle, three groups of the blocker and louver doors are uniformly spaced apart from each other.

The three blocker doors 56 in each nacelle half preferably have trapezoidal configurations for circumferentially adjoining each other inside the inner skin 40 when deployed as illustrated in FIG. 3 for blocking the fan flow from exiting through the fan nozzle. Instead, the fan flow is diverted through the open louver doors as illustrated in FIG. 2 and directed axially forwardly for providing thrust reverse operation in landing of the aircraft.

The use of the bifold blocker and louver doors illustrated in FIG. 6 provides a relatively compact and lightweight fan thrust reverser which is fully contained within the annular compartment formed between the outer and inner skins 38,40 of the nacelle. The nacelle itself remains stationary, and includes the stationary or fixed fan nozzle downstream of the fan reverser. And, the turbofan engine may operate normally without any obstruction of the fan bypass flow from the stowed reverser doors, which doors are readily deployed for thrust reverse operation when required.

The multiple outside louver doors cooperating with the inside blocker door enjoy efficiency of operation like conventional cascade turning vanes, but without the corresponding complexity associated therewith. Although increasing the number of louver doors in series correspondingly decreases the size thereof, the two louver door configuration illustrated in FIG. 6 should be sufficient for most aircraft engine applications. And, the louver doors may be otherwise mounted and actuated within the nacelle compartment in various configurations consistent with their deployment and stowing as described above.

More specifically, FIGS. 9–17 illustrate additional embodiments of the fan thrust reverser which show various modifications of the components thereof.

Figure 9:
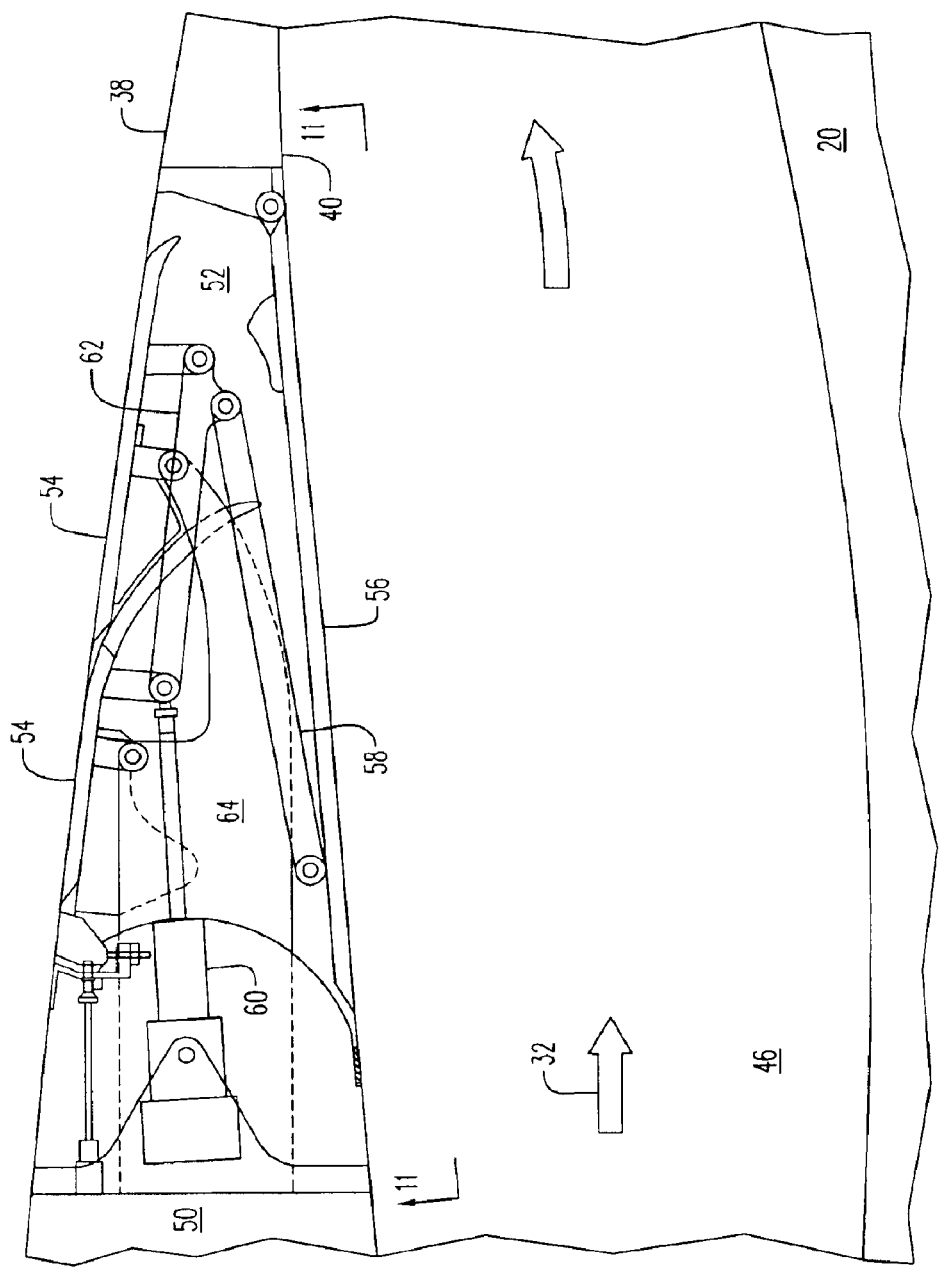
FIG. 9 is an axial sectional view, like FIG. 4, of the stowed fan reverser in accordance with a second embodiment.
Figure 10:
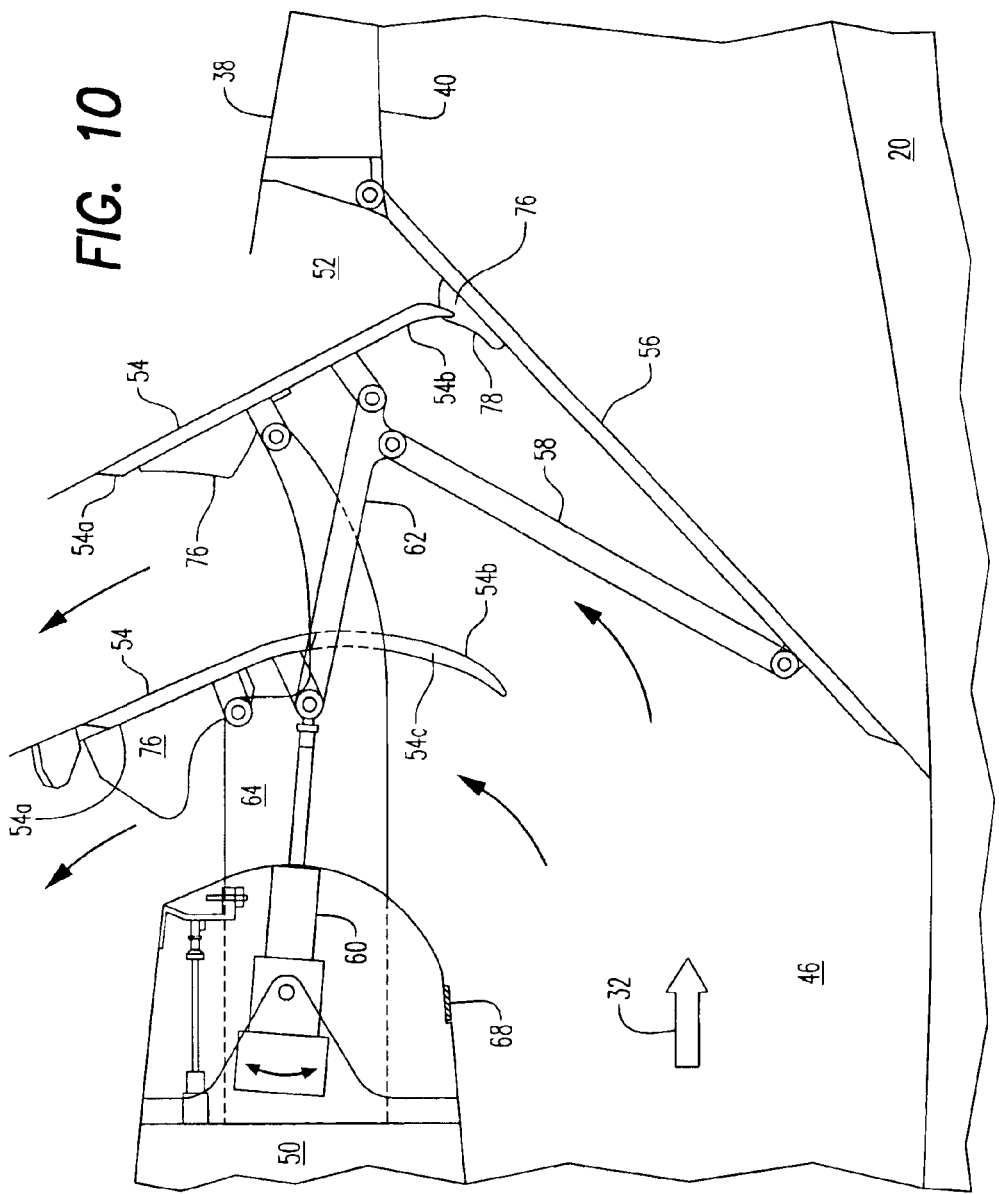
FIG. 10 is an axial sectional view, like FIG. 5, of the deployed second embodiment of the fan reverser.

For example, in FIGS. 9 and 10, the drive actuator 60 is pivotally joined to the fan nacelle in a suitable cradle inside the reverser compartment 50, and the output rod thereof is directly pivotally joined to the middle of the forward louver door 54. By pivot mounting the actuator 60 in FIGS. 9 and 10, the idler link 66 in FIGS. 4 and 5 may be eliminated by permitting proper kinematic operation of the deploying and stowing linkage.

Figure 11:
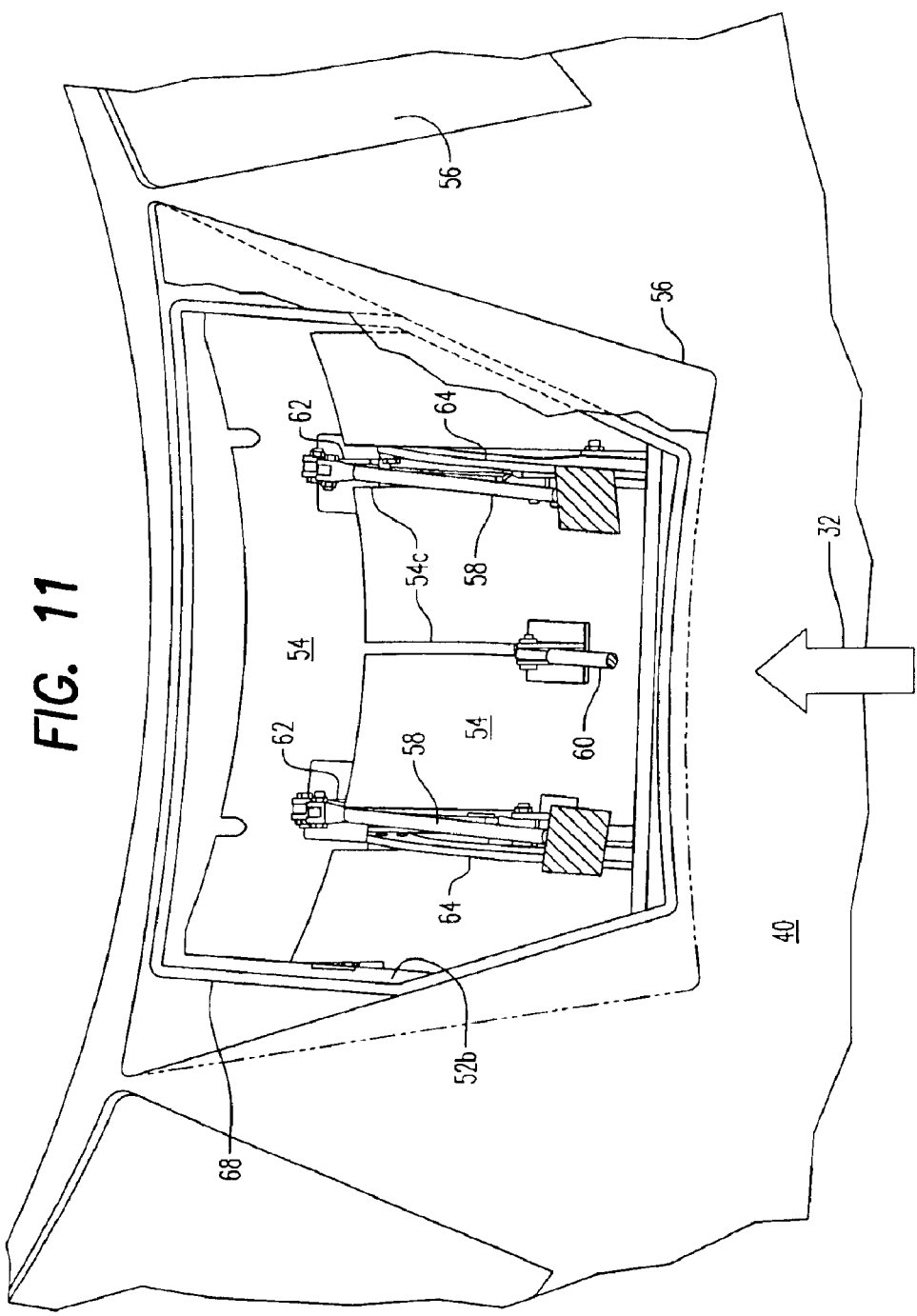
FIG. 11 is a radially outwardly facing planiform view of a portion of the fan reverser illustrated in FIG. 9 and taken generally along line 11—11.

In FIGS. 9–11, a pair of the unison links 62 are correspondingly mounted to the louver doors 54 axially along respective ones of the two cantilevers 64. And, two corresponding drive links 58 extend from the aft ends of the unison links to the forward ends of the blocker doors.

The output rod of the pivoted actuator 60 may then be conveniently mounted to a suitable clevis at the middle of the forward louver door between the two cantilevers as illustrated in FIG. 11. Deployment of the forward louver door in turn deploys the aft louver door and the common blocker door interconnected by the pairs of unison links 62 and drive links 58.

Figure 13:
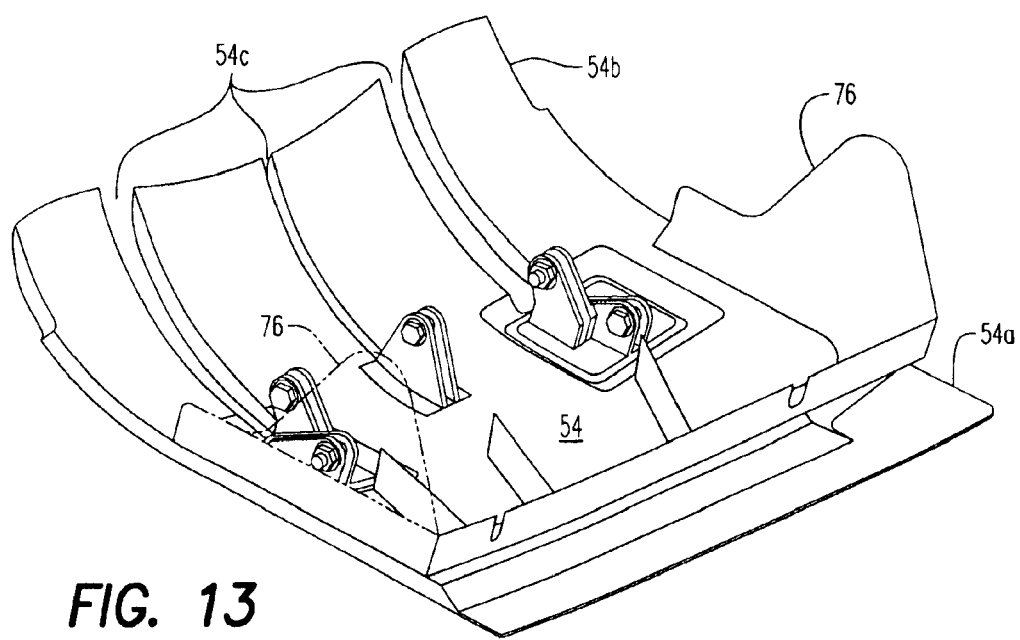
FIG. 13 is an isolated isometric view of the forward outer door of the fan reverser illustrated in FIG. 10.

Note the two outboard axial slots 54c in the aft end of the forward louver door illustrated in FIGS. 11 and 13 which provide access for the unison and drive links during deployment. Note also the center axial slot 54c as well. The three slots 54c permit airflow therethrough when the louver doors are open as shown in FIG. 10. The airflow through these slots ensures flow attachment of the air on the aft surface of the forward louver door 54 for improving efficiency of thrust reverse operation.

Figure 12:
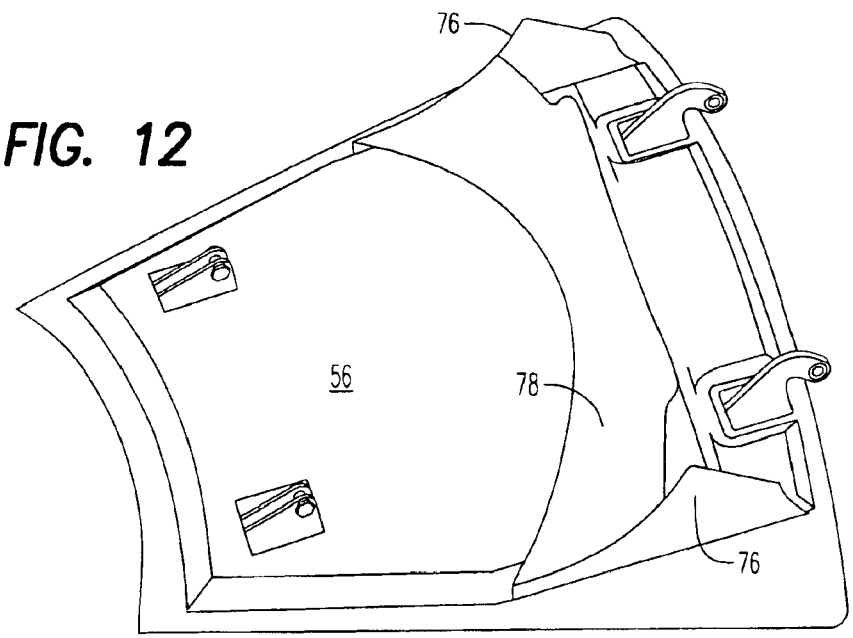
FIG. 12 is an isolated isometric view of the inner blocker door of the fan reverser illustrated in FIG. 10.
Figure 14:
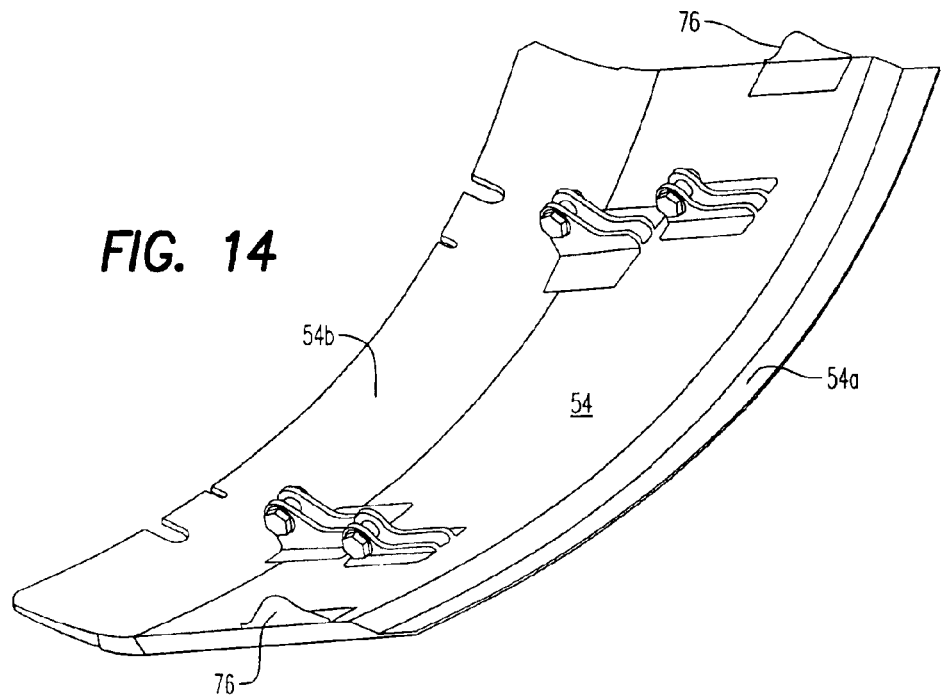
FIG. 14 is an isolated isometric view of the aft outer door of the fan reverser illustrated in FIG. 10.

FIGS. 12–14 illustrate in isolation additional features of the exemplary louver and blocker doors. For example, each of the louver doors illustrated in FIGS. 13 and 14 may include radial side fairings 76 along opposite circumferential sides of the forward ends thereof which correspond with the sidewalls 52b of the flow tunnel. As shown in FIG. 10, the side fairings 76 help confine the reverse airflow as it flows outwardly from the flow tunnel for improving efficiency of thrust reverse. The side fairings 76 of the front louver door is suitably larger than the side fairing of the aft louver door to accommodate the different configurations of the flow passages defined thereby.

As shown in FIGS. 10,13, and 14 the corresponding aft ends 54b of the louver doors 54 preferably converge to a sharp point or edge which defines the leading edge for the bypass air during thrust reversal operation. This creates a sharp leading edge that reduces or eliminates flow stagnation from the incident fan air during door deployment.

As shown in FIG. 10 the aft end 54b of the forward louver door 54 aft of its pivot joint with the cantilever preferably has a larger surface area than its forward end 54a forward thereof.

Similarly, the aft end 54b of the aft louver door 54 aft of its pivot joint with the cantilever is preferably larger in surface area than the forward end 54a forward of the pivot joint.

In this way, the aerodynamic pressure loads over the aft ends of the two louver doors 54 cooperate with the drive actuator 60 to assist in closing the louver doors to their fully stowed positions.

Each of the louver doors and blocker door may be optimized in configuration for their location and function in the fan reverser. Although the louver doors 54 are similarly configured, they may also include suitable differences since the aft louver door cooperates with the blocker door 56, and the forward louver door is spaced forwardly therefrom. For example, the aft louver door 54 may be mounted to the cantilevers to pivot a few degrees less than that of the forward louver door 54 when deployed.

Like the louver doors, the blocker door 56 illustrated in FIG. 12 includes side fences or fairings 76 along the circumferentially opposite sides of the aft end thereof. And, the inner surface of the blocker door 56 may also include an axially arcuate louver fairing 78 in the aft end thereof for adjoining the arcuate aft end of the aft louver door 54 as illustrated in FIG. 10 when deployed. In this way, a smooth transition in airflow occurs along the inner surface of the blocker door 56 and on to the inner surface of the aft louver door 54.

Figure 15:
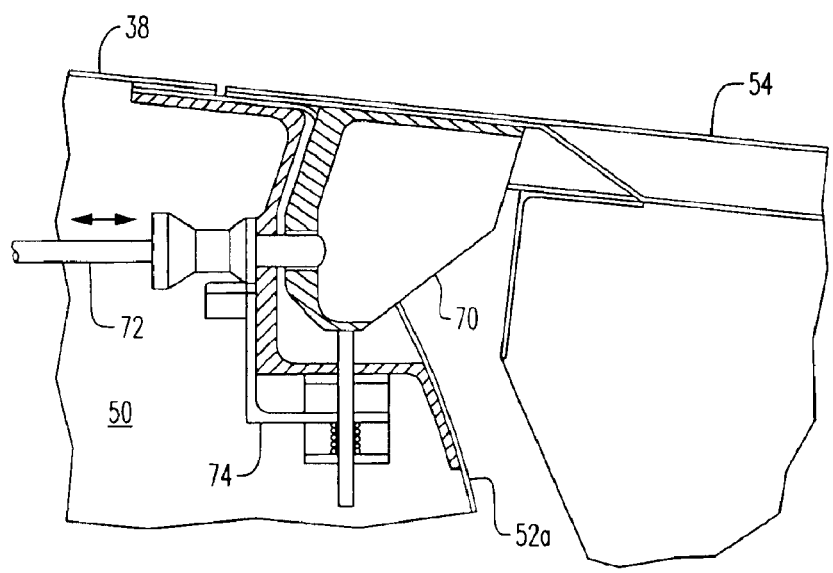
FIG. 15 is an enlarged axial sectional view of a second embodiment of a locking mechanism for the forward outer door stowed closed in the fan reverser illustrated in FIG. 9.
Figure 16:
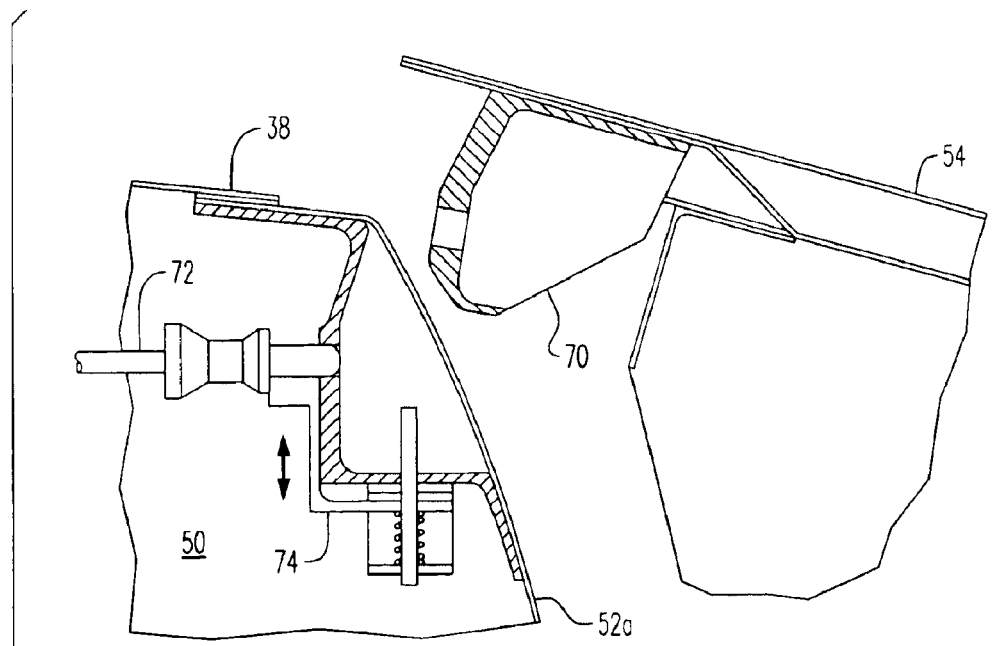
FIG. 16 is an enlarged axial sectional view, like FIG. 15, of the locking mechanism as the forward outer door is deployed open.

In the embodiment illustrated in FIGS. 7 and 8, the locking tab 70 is fixedly mounted to the forward end of the blocker door, with the locking actuator 72 and retainer 74 being mounted to the nacelle adjacent the inner skin 40. FIGS. 15 and 16 illustrate a variation of this locking mechanism wherein the locking tab 70 is fixedly mounted to the forward end of the forward louver door 54, with the locking actuator 72 and spring retainer 74 being mounted to the nacelle 16 adjacent the outer skin 38. In all other respects, the locking means are similarly configured and similarly operated to lock closed the forward louver door 54, which in turn locks closed the aft louver door and blocker door joined thereto by the unison and drive links.

Figure 17:
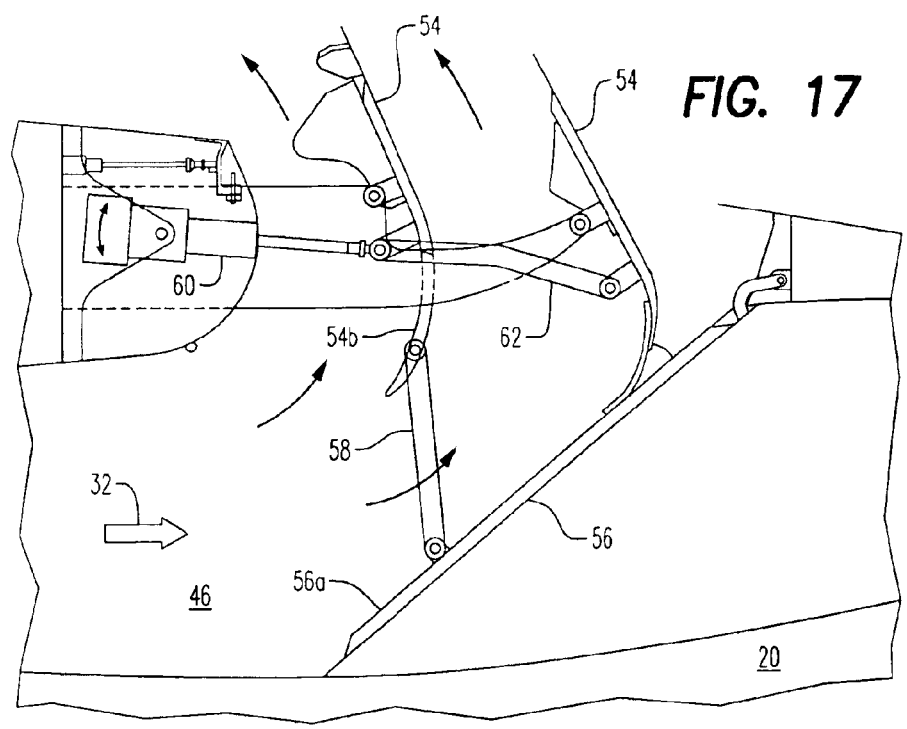
FIG. 17 is an axial sectional view, like FIG. 10, of the fan reverser in accordance with another embodiment.

FIG. 17 illustrates yet another embodiment, like FIG. 10, with the drive link 58 instead being pivotally joined between the aft end 54b of the forward louver door 54 and the forward end 56a of the blocker door 56. In this way, rotation of the forward louver door 54 in turn rotates both the aft louver door 54 through the unison link 62 and the blocker door 56 through the drive link 58.

The various configurations of the bifold louver and blocker doors are exemplary of the various possible embodiments thereof. The louver and blocker doors are pivotally mounted in the fan nozzle at fixed locations. The linkage interconnections thereof permit relatively short actuator stroke to deploy and stow the reverser doors in as few as about 7 cm, and less than about 25 cm. The piston rod of the drive actuator is extended when the reverser doors are stowed, but retracted upon deployment.

The preferred larger surface area on the rear parts of the pivoted louver doors reduces loads in the operation of the kinematic components. The louver doors deploy open in clockwise rotation, while the blocker door deploys open in opposite counterclockwise rotation.

The multiple louver doors permit increased efficiency of operation of the thrust reverser, without adversely affecting normal operation of the turbofan engine with the reverser doors stowed.

The forward louver door, the aft louver door, and the blocker door may be independently optimized for their location in the reverser for providing suitably boundaries for the fan air during thrust reversal operation. The louver doors extend in part radially outwardly from the outer skin and in part radially inwardly from the inner skin for reversing fan flow while cooperating with the blocker door in initially turning the airflow.

The radial configuration of the louver and blocker doors may be optimized for efficiently turning the airflow without excessive protrusion into the ambient free stream outside the outer skin. The side fairings and fences provided on the several reverser doors confine the airflow for improving efficiency of operation. And, as shown in FIG. 13, a kicker plate may also be added at the forward end of the forward louver door for additionally turning the airflow, and axial guide vanes may also be used for controlling discharge of the airflow.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A thrust reverser comprising;
   a fan nacelle having radially outer and inner skins extending axially from a leading edge defining an inlet to a trailing edge defining an outlet;
   an outer door including forward and aft ends, and pivotally mounted to said nacelle in said outer skin;
   an inner door pivotally mounted to said nacelle in said inner skin in opposition with said outer door;
   a drive link pivotally joining together said outer and inner doors;
   an actuator joined to said doors for rotation thereof between a stowed position at which said doors are pivoted closed substantially flush in said inner and outer skins, and a deployed position at which said outer door is pivoted open and extends radially outwardly from said outer skin, and said inner door is pivoted open and extends radially inwardly from said inner skin; and
   said outer door aft end being axially arcuate and adjoining said inner door in said deployed position for reverse turning airflow from said inner door to said outer door.

2. A reverser according to claim 1 wherein:
   said outer and inner skins are spaced radially apart to define a compartment spaced forwardly of said nacelle trailing edge; and
   said doors, link, and actuator are contained within said compartment in said stowed position without obstruction inside said inner skin.

3. A reverser according to claim 2 wherein:
   said outer door is pivotally joined to said nacelle axially between said forward and aft ends thereof for deploying said forward end radially outwardly from said outer skin, and said aft end radially inwardly from said outer skin; and
   said inner door includes forward and aft ends, and is pivotally joined to said nacelle adjacent said aft end of said inner door for deploying radially inwardly said inner door in unfolding opposition to said outer door.

4. A reverser according to claim 3 further comprising:
   a gang of said outer doors pivotally joined to said nacelle in said compartment in axial alignment atop said inner door;
   a unison link pivotally joining together said gang of said outer doors; and
   said drive link pivotally joins together said outer door gang and said inner door for deploying outwardly an unison said outer doors as said inner door is deployed inwardly.

5. A reverser according to claim 4 wherein said gang of outer doors are pivotally joined to said nacelle axially between said forward and aft ends of said outer doors for deploying outwardly in unison said forward ends thereof, and deploying inwardly in unison said aft ends thereof.

6. A reverser according to claim 5 wherein said unison link is pivotally joined to forward and aft ones of said outer doors aft of said pivotal joining of said outer doors with said nacelle.

7. A reverser according to claim 6 further comprising a pair of circumferentially spaced apart cantilevers having proximal ends fixedly mounted to said nacelle in said compartment, with said aft outer door being pivotally joined to distal ends thereof, and said forward outer door being pivotally joined to an intermediate portion thereof.

8. A reverser according to claim 7 wherein said cantilevers are thin circumferentially and thick radially, and said forward outer door includes complementary axial slots extending in said aft end thereof for passing said cantilevers to said aft outer door.

9. A reverser according to claim 6 wherein said drive link is pivotally joined between an aft end of said unison link and said forward end of said inner door.

10. A reverser according to claim 6 wherein said drive link is pivotally joined between said aft end of said forward outer door and said forward end of said inner door.

11. A reverser according to claim 6 further comprising a single unison link mounted to said outer doors.

12. A reverser according to claim 6 further comprising a pair of said unison links mounted to said outer doors.

13. A reverser according to claim 6 wherein said actuator is fixedly joined to said nacelle inside said compartment, and is pivotally joined to a forward end of said unison link by an idler link therebetween.

14. A reverser according to claim 6 wherein said actuator is pivotally joined to said nacelle inside said compartment, and is pivotally joined to said forward outer door.

15. A reverser according to claim 6 wherein said forward and aft outer doors have axially arcuate aft ends, and are axially nested coextensive with said outer skin when stowed.

16. A reverser according to claim 15 wherein said aft end of said forward outer door has axially longer curvature than said aft end of said aft outer door.

17. A reverser according to claim 6 wherein:
said nacelle compartment includes a flow tunnel extending radially between said inner and outer skins and is closed by said outer and inner doors when stowed; and
said tunnel has a radially arcuate forward wall being substantially concentric with axially arcuate aft ends of said forward and aft outer doors when deployed.

18. A reverser according to claim 17 wherein said forward wall of said tunnel is inclined axially forward at said nacelle outer skin, and said forward ends of said forward and aft outer doors are disposed substantially parallel thereto when deployed.

19. A reverser according to claim 17 wherein said tunnel includes a perimeter seal adjacent said inner skin against which said inner door compresses when stowed.

20. A reverser according to claim 17 wherein said forward and aft outer doors include side fairings along opposite circumferential sides of said forward ends thereof corresponding with sidewalls of said tunnel.

21. A reverser according to claim 17 wherein said forward outer door includes a sharp edge at said aft end thereof for reducing flow stagnation when deployed.

22. A reverser according to claim 17 wherein said forward outer door has a larger area aft end than said forward end thereof aft of said pivotal joining with said nacelle.

23. A reverser according to claim 7 wherein said forward outer door includes axial slots in said aft end for receiving said cantilevers and permitting airflow therethrough when deployed.

24. A reverser according to claim 7 wherein said aft outer door is mounted to said cantilevers to pivot less than said forward outer door when deployed.

25. A reverser according to claim 7 wherein said aft outer door has a larger area aft end than said forward end thereof aft of said pivotal joining with said cantilevers.

26. A reverser according to claim 6 wherein said inner door includes an arcuate louver fairing in said aft end thereof for adjoining said arcuate aft end of said aft outer door when deployed.

27. A reverser according to claim 26 wherein said inner door further includes side fences along opposite circumferential sides of said aft end thereof.

28. A reverser according to claim 6 further comprising:
groups of said inner door and outer doors gangs spaced circumferentially apart around said nacelle; and
said inner doors have trapezoidal configurations for circumferential adjoining each other inside said inner skin when deployed.

29. A reverser according to claim 6 further comprising means for selectively locking closed said outer and inner doors.

30. A reverser according to claim 29 wherein said locking means comprise:
a tab fixedly mounted to one of said doors; and
a locking actuator fixedly mounted to said nacelle, and having an extendable rod aligned with said tab for engaging an aperture therein to lock said doors when stowed.

31. A reverser according to claim 30 wherein said locking means further comprise a spring-loaded retainer mounted to said nacelle adjacent said locking actuator for retaining retracted said rod of said locking actuator when said doors are deployed open.

32. A reverser according to claim 31 wherein:
said locking tab is fixedly mounted to said forward end of said inner door; and
said locking actuator and retainer are mounted to said nacelle adjacent said inner skin.

33. A reverser according to claim 31 wherein:
said locking tab is fixedly mounted to said forward end of said forward outer door; and
said locking actuator and retainer are mounted to said nacelle adjacent said outer skin.

34. A reverser according to claim 6 further comprising:
a core engine having an external core cowl mounted inside said nacelle to define an annular bypass duct therebetween terminating in a fan nozzle at said nacelle trailing edge; and
said inner door is sized to reach said core cowl when deployed, and block flow discharge through said fan nozzle for reversing thrust along said deployed outer door.

35. A reverser according to claim 4 wherein said outer door gang includes a forward outer door having axial slots in said aft end thereof for permitting airflow therethrough when deployed.

36. A fan thrust reverser comprising:
a fan nacelle having outer and inner skins extending between leading and trailing edges, and an annular compartment between said skins having a flow tunnel extending radially therebetween;
a gang of outer louver doors pivotally joined to said nacelle in said compartment to close said tunnel along said outer skin;
an inner blocker door pivotally joined to said nacelle in said compartment in opposition with said louver doors to close said tunnel along said inner skin;
a unison link pivotally joining together said louver doors;
a drive link pivotally joining together said louver doors with said blocker door;

an actuator joined to said louver doors for simultaneously rotating said louver doors from a stowed position closing said tunnel at said outer skin to a deployed position inclined outwardly from said outer skin to open said tunnel;

said drive link being configured for correspondingly pivoting said blocker door between a stowed position thereof closing said tunnel to a deployed position thereof opening said tunnel; and an aft one of said louver doors having an axially arcuate aft end adjoining said blocker door in said deployed position for reverse turning airflow from said blocker door to said louver doors.

37. A reverser according to claim 36 wherein said louver doors include axially spaced apart forward and aft ends, and are pivotally mounted to said nacelle axially between said ends for deploying said forward ends thereof radially outwardly from said outer skin, and said aft ends thereof radially inwardly from said inner skin.

38. A reverser according to claim 37 wherein said louver doors have axially arcuate aft ends, and are axially nested coextensive with said outer skin when stowed.

39. A reverser according to claim 38 wherein said blocker door includes an aft end pivotally mounted to said nacelle for deploying a forward end thereof radially inwardly in opposite inclination with said louver doors.

40. A reverser according to claim 39 further comprising means for selectively locking closed said louver and blocker doors when stowed.

\* \* \* \* \*

UNITED STATES PATENT AND TRADEMARK OFFICE
CERTIFICATE OF CORRECTION

PATENT NO. : 6,895,742 B2
DATED : May 24, 2005
INVENTOR(S) : Jean-Pierre Lair et al.

It is certified that error appears in the above-identified patent and that said Letters Patent is hereby corrected as shown below:

Column 12,
Line 56, delete "an" and substitute -- in --.

Column 13,
Line 37, delete "cutter" and substitute -- outer --.

Signed and Sealed this

Thirtieth Day of August, 2005

JON W. DUDAS
*Director of the United States Patent and Trademark Office*